UNITED STATES PATENT OFFICE.

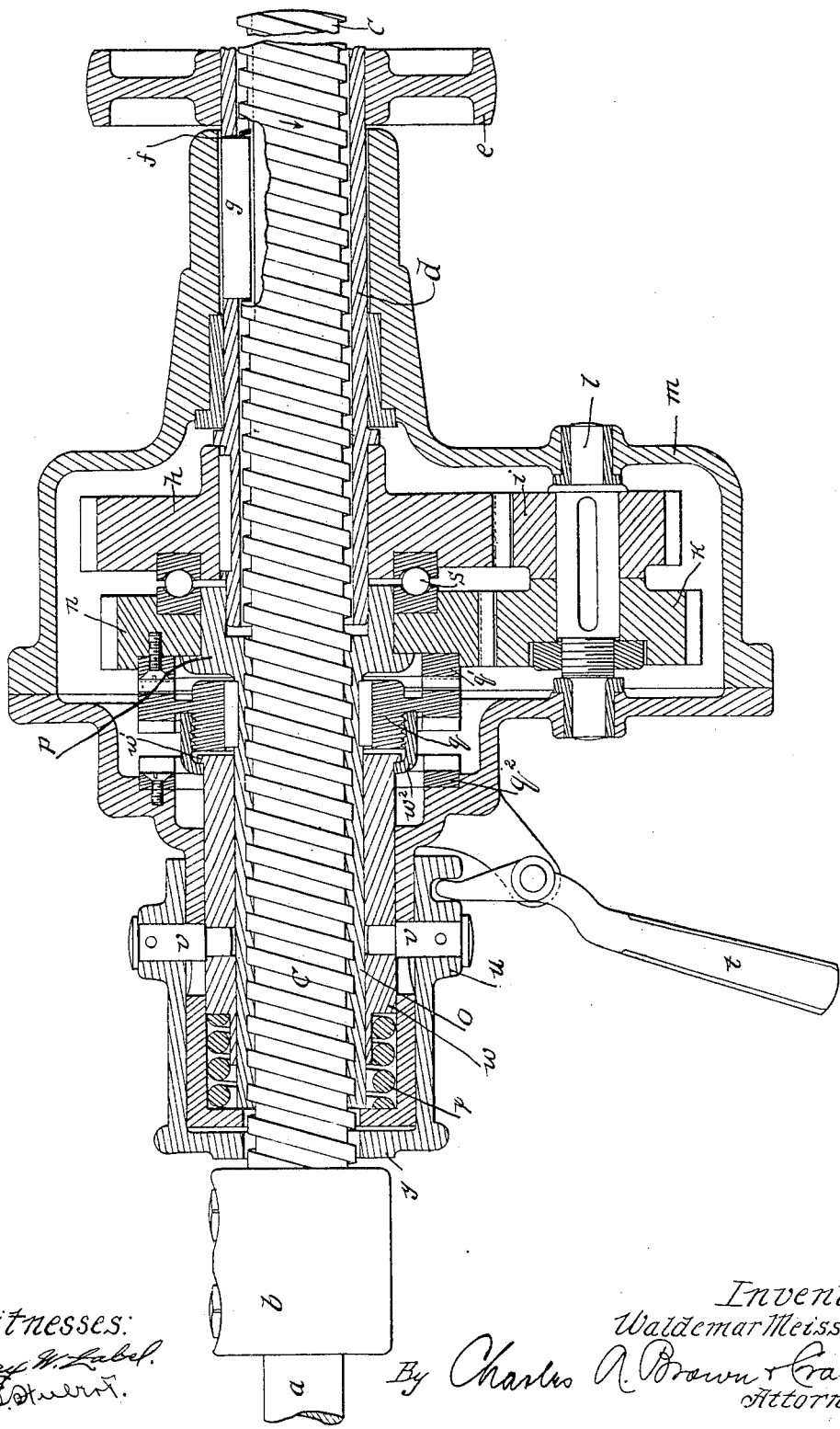

WALDEMAR MEISSNER, OF CHARLOTTENBURG, GERMANY, ASSIGNOR TO SIEMENS & HALSKE ELECTRIC COMPANY OF AMERICA, OF CHICAGO, ILLINOIS, A CORPORATION OF ILLINOIS.

MACHINE-DRILL.

No. 801,805.  Specification of Letters Patent.  Patented Oct. 10, 1905.

Application filed January 2, 1900. Serial No. 123.

*To all whom it may concern:*

Be it known that I, WALDEMAR MEISSNER, a subject of the Emperor of Germany, residing at Charlottenburg, Germany, have invented a certain new and useful Improvement in Machine-Drills, (Case No. 275,) of which the following is a full, clear, concise, and exact description, reference being had to the accompanying drawing, forming a part of this specification.

My invention relates to machine-drills, and particularly to that class of drills known as "rotary" drills, and has for its main object the construction of a drill wherein the drill member may be constantly rotated and the provision of supplemental means interposed between the source of motive power and the drill for effecting its advance and withdrawal without stopping the operation of the apparatus.

In the preferred embodiment of my invention I employ a drill member, preferably a drill-chuck, which is threaded. This chuck receives the drill at one end and is provided with means for effecting its rotation, and thereby the rotation of the drill. In order to feed the drill as it rotates, I provide a threaded sleeve for the chuck-stem, which is also threaded, the drill being advanced toward the work by reason of the engagement of the threads upon its chuck with the threads of the sleeve. In accordance with the invention I so construct and arrange the said sleeve and mechanism in association therewith that I am enabled to govern and vary the relative speed and direction of rotation of the sleeve and drill, so that the drill may be inserted or withdrawn without stopping the apparatus. The sleeve is also preferably arranged to be rotated by the same power that rotates the drill in a direction to cause a slow advance of the drill, the relative rotation of the sleeve and drill, being reversed to effect a rapid withdrawal of the drill.

I will point out my invention particularly in the claims and will more fully explain the same by reference to the accompanying drawing, which shows a longitudinal sectional elevation of a drilling apparatus constructed in accordance with the invention.

The drill $a$ may be of any kind suited to the work that is to be done and is held by a suitable chuck $b$. The stem $c$ of the chuck is threaded, a left-hand thread being in this instance shown, as the drill is designed to be turned toward the right in effecting its work, the threads upon the stem receiving the force of the axial thrust more squarely than if they were right-hand threads. If the drill were to be rotated toward the left in its operation, which is usually not done, the threads upon the chuck-stem should be right-hand threads for the same reason. In the form of machine shown there is a driving-sleeve $d$, which is preferably rotated through the agency of a pulley $e$, that may be operated by any suitable form of prime mover. An elongated keyway $f$ is provided in the chuck-stem and has engagement with a key $g$, carried by the sleeve or shaft $d$, whereby the drill-chuck and drill are caused to rotate with the driving-sleeve, while being at the same time capable of longitudinal movement thereof to permit the drill to be advanced toward or from the work.

The driving-sleeve is provided with a large gear-wheel $h$, preferably secured thereto by means of a key, as shown. This gear-wheel engages a small pinion $i$, preferably rigidly secured to a second pinion $k$, the pinions being preferably mounted upon a common shaft $l$, journaled in the casing $m$ of the machine. A second gear-wheel $n$, larger than the pinions $i$ and $k$, but smaller than the gear-wheel $h$, is loosely mounted upon the member $o$, which is capable of effecting the longitudinal movement of the drill. This member is preferably in the form of a sleeve threaded upon its interior, the threaded stem of the chuck passing through and engaging the threaded bore of the sleeve. In the form shown the wheel $n$ is loosely mounted upon an annular shoulder $p$, a longitudinally-movable clutch $q$ serving to secure a fixed engagement between the wheel $n$ and the sleeve $o$ when moved to the right by being brought into engagement with a corresponding clutch $q'$, carried by the wheel, the said clutch serving to release the said engagement when moved to the left, the clutch at the same time engaging a corresponding clutch $q^2$, carried by the frame $m$, to check and stop the rotation of the sleeve $o$.

The casing $m$ preferably incloses most of the working parts, the casing serving as means for supporting the mechanism upon any suitable support.

The sleeves $o$ and $d$ and the gear-wheels $n$ and $h$ are all preferably coaxial, the wheels $h$ and $n$ being separated by a roller-bearing $s$.

It will be apparent from an inspection of the drawing that the clutch $q$ serves as a means for connecting the shaft $d$ with the sleeve $o$ when said clutch is moved toward the right, whereby through the agency of the gearing $h\ i\ k\ n$ the said sleeve is caused to rotate in the same direction (which is that indicated by the arrow) with the shaft, but at a more rapid rate of speed. By this means the drill is permitted only to advance slowly toward the work. By changing the relative rotation or the relative directions of rotation of the chuck-stem and the sleeve $o$—that is, instead of having them rotate relatively in the same direction cause them to rotate relatively in opposite directions—I am enabled to effect the withdrawal of the drill without stopping the apparatus and without changing the direction of rotation of the drill. This I preferably accomplish by stopping the rotation of the sleeve $o$, which may be accomplished by moving the clutch $q$ to the left to disconnect the sleeve $o$ from the shaft $d$ and at the same time engage the clutch $q$ with the clutch $q^2$ to check and stop the rotation of the sleeve $o$. For this purpose I preferably employ a manually-operated means, though I do not wish to be limited to such means. The device that I prefer to employ is in the form of a hand-lever $t$, pivotally mounted upon the casing of the machine. The nose of this lever engages a longitudinally-movable and non-rotatable sleeve $u$, located between the gearing and the chuck $b$, the said sleeve inclosing the contiguous sleeve portion of the casing $m$. This sleeve is provided with a pair of pins $v\ v$, which project through longitudinal recesses in the casing $m$ and radially inward toward the drill, the inner ends of these pins engaging a second longitudinally-movable and non-rotatable sleeve $w$, intervening between the casing $m$ and the threaded sleeve $o$. The inner end of the sleeve $w$ is provided with an outwardly-projecting collar $w'$. A collar $w^2$ is screwed upon the longitudinally-movable clutch member $q$, the collar being provided with an interiorly-projecting flange, between which and the clutch $q$ the collar $w'$ is engaged. A coiled spring $x$ is interposed between an end wall of the casing $m$ and the sleeve $w$, the spring serving normally to thrust the sleeve $w$, with its collar $w'$, toward the gearing, thereby effecting an engagement between the clutch $q$ and the gear-wheel $n$, thus engaging the driving-shaft $d$ with the sleeve $o$ through the agency of the gearing, which causes the sleeve $o$ to rotate in the same direction with but somewhat faster than the shaft $d$. The sleeve $o$ by rotating in the same direction with but faster than the drill-chuck causes the latter to be forced forward. When the drill is to be withdrawn, I prefer to reverse the relative movements of the drill-chuck and sleeve $o$ by stopping the rotation of the latter. This may be accomplished by moving the lever $t$ in the direction indicated by the arrow, which through the agency of the sleeves $u$ and $w$ and the pins $v\ v$ effects a longitudinal movement of the clutch $q$ to cause its disengagement from the clutch $q'$ and to effect the engagement of clutch $q$ with the clutch member $q^2$, which, being stationarily mounted upon the casing $m$, stops the rotation of the sleeve $o$. After the drill has been withdrawn its position with reference to the work is readjusted, the clutch members $q\ q^2$ are disengaged by moving the lever $t$ in the reverse direction, and the drill is again ed forward upon the engagement of the clutch parts $q\ q'$ effected by the spring $x$.

If the clutch members $q$ and $q^2$ were held in engagement too long, the drill-chuck would be moved too far to the rear, thereby causing breakage. I therefore provide an abutment $y$, against which the chuck-head $b$ may impinge, a longitudinal movement of the clutch $q$ away from the clutch $q^2$ being thereby effected upon the consequent longitudinal movement of the sleeves $u$ and $w$.

It is obvious that a large variety of clutch devices and many different arrangements of gearing may be employed and that various features of construction may be modified without departing from the spirit of my invention, and I do not, therefore, wish to be limited to the precise construction shown; but,

Having thus described my invention, I claim as new, and desire to secure by Letters Patent, the following:

1. In a drilling-machine, the combination with a threaded member for supporting the drill, of driving means for rotating the said member in a single direction, a threaded sleeve engaging the threaded member, gearing interposed between the driving means and said sleeve for rotating the sleeve in the same direction with, and faster than, the drill, said sleeve being adapted, when thus rotated, to feed the drill toward the work, a clutch rotating with the sleeve, for connecting said sleeve with and disconnecting it from the gearing, and a fixed clutch member adapted for engagement with the aforesaid clutch and coöperating therewith to stop the rotation of the sleeve, substantially as described.

2. In a drilling-machine, the combination with a threaded member for supporting the drill, of driving means for rotating the said member in a single direction, a threaded sleeve engaging the threaded member, gearing interposed between the driving means and said sleeve for rotating the sleeve in the same direction with and faster than the drill, said sleeve being adapted, when thus rotated, to feed the drill toward the work, a clutch rotating with the sleeve and movable longitudinally thereof for connecting said sleeve with and disconnecting it from the gearing, a fixed clutch member adapted for engagement with the aforesaid clutch and coöperating therewith to stop the rotation of the sleeve, a spring for actuating the movable clutch in one direction and means for actuating the movable clutch in opposition to said spring, substantially as described.

3. In a drilling-machine, the combination with a threaded member for supporting the drill, of driving means for rotating the said member in a single direction, a threaded sleeve engaging the threaded member, gearing interposed between the driving means and said sleeve for rotating the sleeve in the same direction with and faster than the drill, said sleeve being adapted, when thus rotated, to feed the drill toward the work, a clutch rotating with the sleeve and movable longitudinally thereof for connecting said sleeve with and disconnecting it from the gearing, a fixed clutch member adapted for engagement with the aforesaid clutch and coöperating therewith to stop the rotation of the sleeve, a spring for actuating the movable clutch in one direction and a hand-lever for actuating the movable clutch in opposition to said spring, substantially as described.

4. In a drilling-machine, the combination with a threaded member for supporting the drill, of driving means for rotating the said member in a single direction, a threaded sleeve engaging the threaded member, gearing interposed between the driving means and said sleeve for rotating the sleeve in the same direction with and faster than the drill, said sleeve being adapted, when thus rotated, to feed the drill toward the work, a clutch rotating with the sleeve and movable longitudinally thereof for connecting said sleeve with and disconnecting it from the gearing, a fixed clutch member adapted for engagement with the aforesaid clutch and coöperating therewith to stop the rotation of the sleeve, a spring for actuating the movable clutch in one direction to connect the gearing with the sleeve to rotate the same and a hand-lever for actuating the movable clutch in opposition to said spring to stop the rotation of the sleeve, substantially as described.

5. In a drilling-machine, the combination with a threaded member for supporting the drill, of driving means for rotating the said member in a single direction, a threaded sleeve engaging the driving member, gearing interposed between the driving means and said sleeve for rotating the sleeve in the same direction with and faster than the drill, said sleeve being adapted, when thus rotated, to feed the drill toward the work, a clutch rotating with the sleeve and movable longitudinally thereof for connecting said sleeve with and disconnecting it from the gearing, a fixed clutch member adapted for engagement with the aforesaid clutch and coöperating therewith to stop the rotation of the sleeve, a spring for actuating the movable clutch in one direction to connect the gearing with the sleeve to rotate the same, a hand-lever for actuating the movable clutch in opposition to said spring to stop the rotation of the sleeve, and a buffer connected with the movable clutch adapted to be engaged by the drill-supporting member when it approaches the limit of the rearward movement to disconnect the movable clutch member from the stationary member, substantially as described.

6. In combination, a threaded shaft, a rotatable bearing for said shaft in threaded engagement therewith, means for rotating the shaft continuously in one direction, means for rotating the bearing in the same direction but faster than the shaft to cause a longitudinal movement of the shaft in the one direction, and means for locking the bearing against movement to produce a longitudinal movement of the shaft in the opposite direction.

7. In combination, a threaded tool-carrying member, a rotatable bearing having a threaded engagement with said member, means for continuously rotating said tool-carrying member in one direction, driving means for rotating said bearing relative to the tool-carrying member, a fixed clutch member, a movable clutch member sleeved on said bearing, and means for moving said movable clutch member longitudinally in one direction to connect the bearing to said driving means and in the opposite direction to connect the bearing to the fixed clutch member.

8. In combination, a threaded shaft, means for continuously rotating the shaft in one direction, a bearing for the shaft in threaded engagement therewith, speed-increasing gearing, and means for obtaining a relative rotation of the bearing relatively to the shaft in one direction or the other at will, said last-mentioned means comprising means for locking said bearing against rotation or for connecting said bearing to said shaft by said speed-increasing gearing.

9. In combination, a rotatable threaded shaft, a bearing for said shaft in threaded engagement therewith, a member concentric with said shaft and geared thereto to run in the same direction but faster than the shaft, a fixed clutch member, a movable clutch member connected to said bearing to turn with it, and means for moving said movable clutch member in one direction to lock the bearing to said concentric member or to move it in the opposite direction to lock it to said fixed clutch member.

In witness whereof I hereunto subscribe my name this 24th day of October, A. D. 1899.

WALDEMAR MEISSNER.

Witnesses:
  RICHARD OPOLOWITZ,
  M. HANNKE.